United States Patent
Choo et al.

(10) Patent No.: US 6,642,979 B2
(45) Date of Patent: *Nov. 4, 2003

(54) TRANSFLECTIVE LCD DEVICE AND METHOD OF FABRICATING THE SAME

(75) Inventors: Kyo-Seop Choo, Seoul (KR); Jae-Young Chung, Pusan (KR)

(73) Assignee: LG. Philips LCD Co., Ltd., Seoul (KR)

( * ) Notice: Subject to any disclaimer, the term of this patent is extended or adjusted under 35 U.S.C. 154(b) by 170 days.

This patent is subject to a terminal disclaimer.

(21) Appl. No.: 09/877,229

(22) Filed: Jun. 11, 2001

(65) Prior Publication Data

US 2002/0044240 A1 Apr. 18, 2002

(30) Foreign Application Priority Data

Jun. 12, 2000 (KR) .......................................... 2000-32247

(51) Int. Cl.[7] ............................................. G02F 1/1335
(52) U.S. Cl. ........................................ 349/113; 349/43
(58) Field of Search ................................ 349/114, 113, 349/158, 93

(56) References Cited

U.S. PATENT DOCUMENTS 6,452,654 B2 * 9/2002 Kubo et al. ................ 349/114
6,466,280 B1 * 10/2002 Park et al. ................. 349/43

* cited by examiner

*Primary Examiner*—Toan Ton
(74) *Attorney, Agent, or Firm*—Morgan Lewis & Bockius LLP

(57) ABSTRACT

An array substrate for a liquid crystal display device, including a substrate, at least one gate line and at least one gate electrode formed on the transparent substrate, a gate insulating layer formed over the at least one gate line and the at least one gate electrode, a silicon layer formed on the gate insulating layer, the silicon layer being positioned above the at least one gate electrode, a source electrode and a drain electrode formed on the silicon layer and spaced apart from each other with the silicon layer overlapped therebetween, wherein the at least one gate electrode, the source electrode, the drain electrode, and the silicon layer comprise a thin film transistor (TFT), at least one data line, a first passivation layer covering the at least one data line, a reflective electrode covering a portion of a pixel region defined by the at least one gate line and the at least one data line, a second passivation layer formed on the reflective electrode, and a transparent electrode formed on the second passivation layer, wherein the transparent electrode is disposed in the pixel region.

17 Claims, 11 Drawing Sheets

TRANSFLECTIVE LCD DEVICE AND METHOD OF FABRICATING THE SAME

This application claims the benefit of Korean patent application No. 2000-32247, filed Jun. 12, 2000 in Korea, which is hereby incorporated by reference.

BACKGROUND OF THE INVENTION

1. Field of the Invention

The present invention relates to a liquid crystal display device, and more particularly to a transflective liquid crystal display (LCD) device implementing selectable reflective and transmissive modes.

2. Discussion of the Related Art

Generally, a transflective LCD device has advantages of both a transmissive LCD device and a reflective LCD device. Because the transflective LCD device uses a back light as well as an ambient light source, it is not dependent upon exterior light source conditions, and consumes relatively low power.

FIG. 1 is an exploded perspective view illustrating a typical transflective LCD device. The transflective LCD device 11 includes an upper substrate 15 and a lower substrate 21 that are opposed to each other, and a liquid crystal layer 23 interposed therebetween. The upper substrate 15 and the lower substrate 21 are called a color filter substrate and an array substrate, respectively. On the upper substrate 15, a black matrix 16 and a color filter layer 17 including a plurality of red (R), green (G), and blue (B) color filters are formed. The black matrix 16 surrounds each color filter such that an array matrix feature is formed. Further on the upper substrate 15, a common electrode 13 is formed to cover the color filter layer 17 and the black matrix 16.

On the lower substrate 21 opposing the upper substrate 15, a thin film transistor (TFT) "T", as a switching element, is formed in shape of an array matrix corresponding to the color filter layer 17. In addition, a plurality of crossing gate and data lines 25 and 27 are positioned such that each TFT "T" is located near each crossing portion of the gate and data lines 25 and 27. The crossing gate and data lines define a pixel region "P". On the pixel region "P", a pixel electrode 19 is formed. The pixel electrode 19 includes a transmissive portion "A" and a reflective portion "C".

FIG. 2 is a cross-sectional view illustrating operation modes of the typical transflective LCD device 1. As shown, the transflective LCD device 11 includes the upper substrate 15 having the common electrode 13, the lower substrate 21 having the pixel electrode 19, the liquid crystal layer 23 interposed therebetween, and a back light 41 disposed below the lower substrate 21. The pixel electrode 19 includes a reflective electrode 19b having a through-hole "A" and a transparent electrode 19a positioned below the reflective electrode 19b. The transparent electrode 19a is separated from the reflective electrode 19b by a passivation layer 71 interposed therebetween.

For a reflective mode, the transflective LCD device 11 uses a first ray "B" of ambient light, which may radiate from an exterior natural light source or from an exterior artificial light source. The first ray "B" passes through the upper substrate 15 and is reflected by the reflective electrode 19b back through the liquid crystal layer 23, which is aligned by the application of an electric field between the reflective electrode 19b and the common electrode 13. Accordingly, the aligned liquid crystal layer 23 controls the first ray "B" so as to display an image.

For a transmissive mode, the transflective LCD device 11 uses a second ray "F" of light, which radiates from the back light 41. The second ray "F" sequentially passes through both the transparent 19a and reflective 19b electrodes and the liquid crystal layer 23 which is aligned by the application of an electric field between the transparent electrode 19a and the common electrode 13. Accordingly, the aligned liquid crystal layer 23 controls the second ray "F" so as to display an image.

FIG. 3 is an expanded plan view illustrating a portion of an array substrate for a conventional transflective LCD device. As shown in FIG. 3, a gate line 25 is arranged in a transverse direction, and a data line 27, arranged perpendicular to the gate line 25, are both formed upon an array substrate 21 (in FIG. 1). A thin film transistor (TFT) "T" is arranged at a position where both the gate line 25 and the data line 27 cross one another. A pixel electrode 19 comprises both a transparent electrode 19a and a reflective electrode 19b is disposed on a pixel region "P" defined by the gate line 25 and data line 27. The TFT "T" includes a gate electrode 61 to which a scanning signal is applied, a source electrode 63 to which a video signal is applied, and a drain electrode 65 which inputs the video signal to the pixel electrode 19. A gate pad 26 and a source pad 28 are respectively disposed at end portions of the gate line 25 and data line 27. The gate pad 26 and the source pad 28 are to be electrically connected with a drive IC (not shown).

Still referring to FIG. 3, the pixel electrode 19 is a transflective electrode having both the transparent electrode 19a and the reflective electrode 19b. Specifically, the transparent electrode 19a is first formed on the pixel region "P", and is electrically connected with the drain electrode 65 via a first drain contact hole 67. Then, the reflective electrode 19b is formed over the transparent electrode 19a. The reflective electrode 19b is also electrically connected with the drain electrode 65 via the transparent electrode 19a. Thus, the reflective electrode 19b has a through hole "A" corresponding to a transmissive portion of the LCD device 11 such that rays of back light 41 (in FIG. 2) can pass through the through hole "A" for function in the transmissive mode. Portion "C" of the reflective electrode 19b serves as a reflective portion of the LCD device 11 such that rays of the ambient light are thereby reflected.

With reference to FIGS. 4A to 4F, a fabrication process for the array substrate is explained. FIGS. 4A to 4F are sequential cross-sectional views taken along first to third lines "III—III", "IV—IV", and "V—V" of FIG. 3.

At first, as shown in FIG. 4A, a first metal is deposited and patterned on the transparent array substrate 11 such that a gate pad 26, a gate line 25 (in FIG. 3), and a gate electrode 61 are formed. The gate line extends from the gate pad 26, and the gate electrode 61 protrudes from the gate line 25 (in FIG. 3). Thereafter, a gate-insulating layer 62 and a silicon layer 64 are sequentially formed upon the first metal. The silicon layer 64 comprises an amorphous silicon layer 64a and a doped amorphous silicon layer 64b.

Next, as shown in FIG. 4B, the silicon layer 64 (in FIG. 4A) is patterned such that an active layer 66a and an ohmic contact layer 66b are formed to have an island-shaped structure positioned above the gate electrode 61. Thereafter, as shown in FIG. 4C, a second metal is deposited over the island-shaped structure and is subsequently patterned such that a source pad 28 (in FIG. 3), a plurality of data lines 27, a source electrode 63, and a drain electrode 65 are formed. The data line 27 crosses the gate line 25 (in FIG. 3) with the source pad 28 (in FIG. 3) being disposed at one end of the data line 27. The source electrode 63 protrudes from the data line 27, and the drain electrode 65 is spaced apart from the source electrode 63.

Thereafter, an exposed portion of the ohmic contact layer 66b is etched away between the source electrode 63 and the drain electrode 65, and a first passivation layer 71 is formed on the overall surface where the source electrode 63 and the drain electrode 65 are formed. The first passivation layer 71 has formed therein a first drain contact hole 67 positioned over the drain electrode 65, a first gate pad contact hole 32 positioned over the gate pad 26, and a first source pad contact hole 37 (in FIG. 3) positioned over the source pad 28 (in FIG. 3).

Next, as shown in FIG. 4D, a transparent conductive material is deposited upon the first passivation layer 71 and subsequently patterned to form a transparent electrode 19a, a first gate pad terminal 35, and a first source pad terminal 39 (in FIG. 3). The transparent electrode 19a electrically contacts the drain electrode 65, via the first drain contact hole 67, and the first gate pad terminal 35 electrically contacts the gate pad 26, via the first gate pad contact hole 32. Additionally, the first source pad terminal 39 (in FIG. 3) electrically contacts the source pad 28 (in FIG. 3) via a first source pad contact hole 37 (in FIG. 3). At this point, the transparent electrode 19a preferably overlaps portions of the data lines 27 formed on both sides of the pixel region (reference "P" of FIG. 3).

Next, as shown in FIG. 4E, an inorganic insulating material such as silicon oxide, for example, is deposited upon the transparent electrode 19a and subsequently patterned to form a second passivation layer 77. The second passivation layer 77 comprises a second drain contact hole 79 positioned over the drain electrode 65, a second gate pad contact hole 91 positioned over the gate pad 26, and a second source pad contact hole (not shown) positioned over the source pad 28 (in FIG. 3). The second contact holes 79, 91 expose corresponding portions of the transparent electrode 19a.

Next, as shown in FIG. 4F, a second metal is deposited upon the second passivation layer and subsequently patterned to form a reflective electrode 19b having a through hole "A", a second gate pad terminal 83, and a second source pad terminal 85 (in FIG. 3). The second metal is preferably aluminum (Al) or aluminum alloy, for example, which have low resistance and high reflectance properties. The reflective electrode 19b electrically contacts the transparent electrode 19a via the second drain contact hole 79 such that the reflective electrode 19b and the drain electrode 65 are electrically interconnected. The second gate pad terminal 83 electrically contacts the first gate pad terminal 35 via the second gate pad contact hole 91 such that the second gate pad terminal 83 and the gate pad 26 are electrically interconnected. The second source pad terminal 85 (in FIG. 3) electrically contacts the first source pad terminal 39 (in FIG. 3) via the second source pad contact hole (not shown) such that the second source pad terminal and the source pad 28 (in FIG. 3) are electrically interconnected.

For the above dual-contact structure, the transparent electrode 19a contacts the drain electrode 65 via the first drain contact hole 67, and the reflective electrode 19b contacts the transparent electrode 19a via the second drain contact hole 79. In other words, the reflective electrode 19b and the transparent electrode 19a electrically contact the drain electrode 65 via the first and second drain contact holes 67 and 79, respectively. Then, all the liquid crystal molecules of the liquid crystal layer (23 in FIG. 2) disposed on the reflective electrode 19b having the through hole "A" can be aligned regardless of their individual location. Furthermore, both a first liquid crystal portion disposed on the reflective electrode 19b and a second liquid crystal portion disposed on the through hole "A" can both be controlled to have proper alignment direction.

At this point, the transparent electrode 19a is preferably formed of an oxide material such as indium tin oxide (ITO), for example, and the reflective electrode 19b is preferably formed of an aluminum-based metal material, for example, having low resistance and high reflectance properties. However, aluminum-based metals are easily oxidizable. When the oxide material and the aluminum-based metal material make contact with each other, an oxide film is produced on the boundary surface between the oxide and the aluminum-based metal. This oxide film causes a high contact resistance between the drain electrode 65 and the reflective electrode 19b such that operational quality of the TFT ("T" in FIG. 3) deteriorates. Furthermore, use of these materials results in poor adhesion at the gate pad 26 and the source pad 28 (in FIG. 3), as explained hereinafter.

The drive IC (not shown) is installed on an LCD device by applying various methods. A tape carrier package (TCP) is an example of the various installing methods. Using the TCP method, the drive IC is not installed directly on the array substrate, but is included as an independent package. Then, the independent drive IC package is attached to each pad of the LCD device such that signals are applied from the drive IC to each pad. As shown in FIG. 4F, the aluminum-based metal that forms the reflective electrode 19b, the second gate pad terminal 83, and the second source pad terminal 85 (in FIG. 3), is conventionally used for an uppermost layer of each pad. Because the aluminum-based metal is highly ductile and easily oxidizable, adhesion between the TCP and the uppermost layer easily deteriorates when an exterior force is acted thereon.

If an error occurs on attaching the TCP to the array substrate, the TCP is usually removed from the array substrate for the purpose of rework. In this case, the aluminum-based electrodes where the TCP is attached are easily deformed since the aluminum-based metal is highly ductile.

The reflective electrode, the second gate pad terminal, and the second source pad terminal, all of which are made from the aluminum-based metal, may be exposed to degenerative conditions due to misalignment errors between the TCP and the pad. Accordingly, any or all of the reflective electrode, the second gate pad terminal and the second source pad terminal can be easily corroded due to effects resulting from various cleaning processes used to assemble the device, thereby causing defects in the LCD device.

SUMMARY OF THE INVENTION

Accordingly, the present invention is directed to a transflective LCD device that substantially obviates one or more of the problems due to limitations and disadvantages of the related art.

An object of the present invention is to provide a transflective LCD device having a low contact resistance between a drain electrode and a pixel electrode with transparent and reflective electrodes such that a TFT has an improved operation quality.

Another object of the present invention is to provide a transflective LCD device having a good adhesion between a pad and a TCP.

Another object of the present invention is to provide a liquid crystal display device including: a substrate; at least one gate line and at least one gate electrode formed on the transparent substrate; a gate insulating layer formed over the at least one gate line and the at least one gate electrode; a silicon layer formed on the gate insulating layer, the silicon layer being positioned above the at least one gate electrode; a source electrode and a drain electrode formed on the silicon layer and spaced apart from each other with the silicon layer overlapped therebetween, wherein the at least one gate electrode, the source electrode, the drain electrode, and the silicon layer comprise a thin film transistor (TFT); at least one data line; a first passivation layer covering the at least one data line; a reflective electrode covering a portion of a pixel region defined by the at least one gate line and the at least one data line; a second passivation layer formed on the reflective electrode; and a transparent electrode formed on the second passivation layer, wherein the transparent electrode is disposed in the pixel region.

In another aspect, a transflective liquid crystal display device includes a substrate, a gate pad and a gate line formed on the substrate, the gate line including a gate electrode that extends from the gate pad in one direction, the gate pad being disposed on one side of the substrate, a gate-insulating layer formed on the substrate, the gate-insulating layer covering the gate line and the gate electrode, a silicon layer formed on the gate-insulating layer, the silicon layer being disposed over the gate electrode, a source electrode and a drain electrode spaced apart from each other with the silicon layer centered therebetween, a data line formed on the gate-insulating layer, the data line crossing the gate line, connecting with the source electrode, and having a source pad at one end thereof, a pixel region defined by the crossing gate line and the data line, a first passivation layer formed on the source electrode, a reflective electrode formed on the first passivation layer, the reflective electrode having a through hole and being disposed in the pixel region, a second passivation layer formed on the reflective electrode, wherein the second passivation layer includes a drain contact hole positioned over the drain electrode, a gate pad contact hole positioned over the gate pad, and a source pad contact hole positioned over the source pad, each contact hole passing through the second passivation layer, a transparent electrode formed over the reflective electrode; a gate pad terminal formed over the gate pad, and a source pad terminal formed over the source pad, wherein the transparent electrode contacts the drain electrode via the drain contact hole, the gate pad terminal contacts the gate pad via the gate pad contact hole, and the source pad terminal contacts the source pad via the source pad contact hole.

In another aspect, a method of fabricating a transflective liquid crystal display device includes the steps of forming a gate pad, a gate line, and a gate electrode on a substrate, the gate pad being disposed on one side of the substrate, the gate line extending from the gate pad in one direction, forming a gate-insulating layer on the substrate, the gate insulating layer covering the gate line and the gate electrode, forming a silicon layer on the gate-insulating layer, the silicon layer having an island shape and being disposed over the gate electrode, forming a source pad, a data line, a source electrode, and a drain electrode on the gate insulating layer, wherein the data line crosses the gate line and extends from the source pad, and the source electrode and the drain electrode are spaced apart from each other and overlap a portion of the silicon layer, forming a first passivation layer on the substrate to cover the source and drain electrodes, forming a reflective electrode on the first passivation layer, the reflective electrode having a hole therethrough, forming a second passivation layer on the reflective electrode, form-ing a drain contact hole, a gate pad contact hole, and a source pad contact hole pass through the second passivation layer positioned over the drain electrode, the gate pad, and the source pad, respectively, and forming a transparent electrode on the second passivation layer, the transparent electrode contacting the drain electrode via the drain contact hole, contacting the gate pad via the gate pad contact hole, and contacting the source pad via the source pad contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which are illustrated in the accompanying drawings.

In accordance with an embodiment of the present invention, a reflective electrode having a through hole is formed and then a transparent electrode is formed over the reflective electrode such that an uppermost electrode of a gate pad is the same layer as the transparent electrode.

Figure 5:
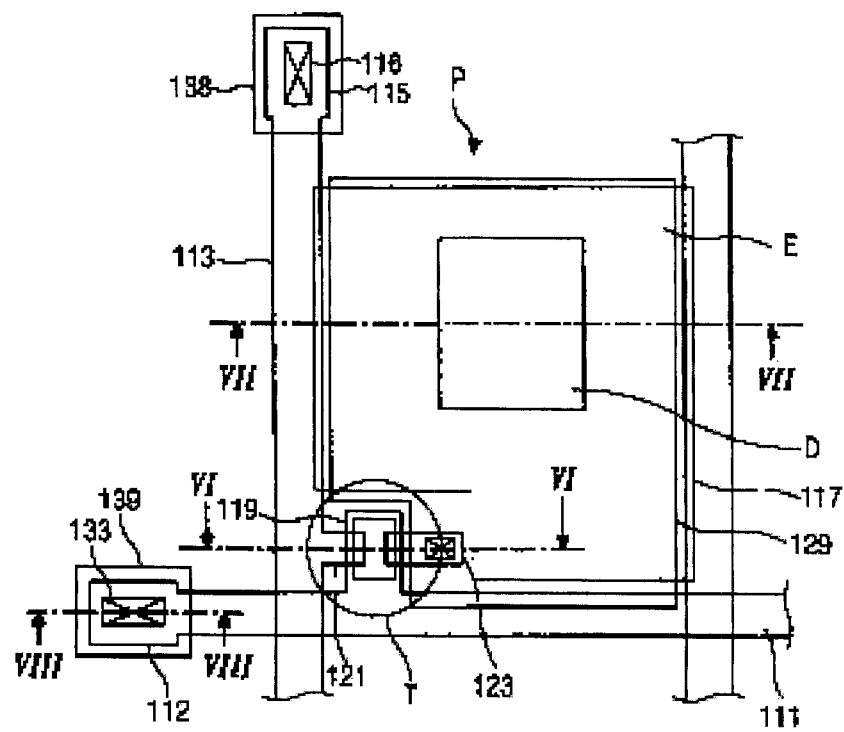
FIG. 5 is an expanded plan view illustrating a portion of an array substrate for a transflective LCD device according to an embodiment of the present invention.

As shown in FIG. 5, on an array substrate (100 in FIG. 6A), a gate line 111 is arranged in a transverse direction, and a data line 113 is arranged perpendicular to the gate line 111. A TFT "T" is arranged at a crossing portion of the gate line 111 and the data line 113, and a pixel region "P" is defined by the gate line 111 and the data line 113. The TFT "T" includes a gate electrode 119, a source electrode 121, and a drain electrode 123. The gate electrode 119 and the source electrode 121 protrude from the gate line 111 and the data line 113, respectively, and the drain electrode 123 is spaced apart from the source electrode 121. A gate pad 112 and a source pad 115 are disposed at ends of the gate line 1111 and the data line 113, respectively.

Figure 2:
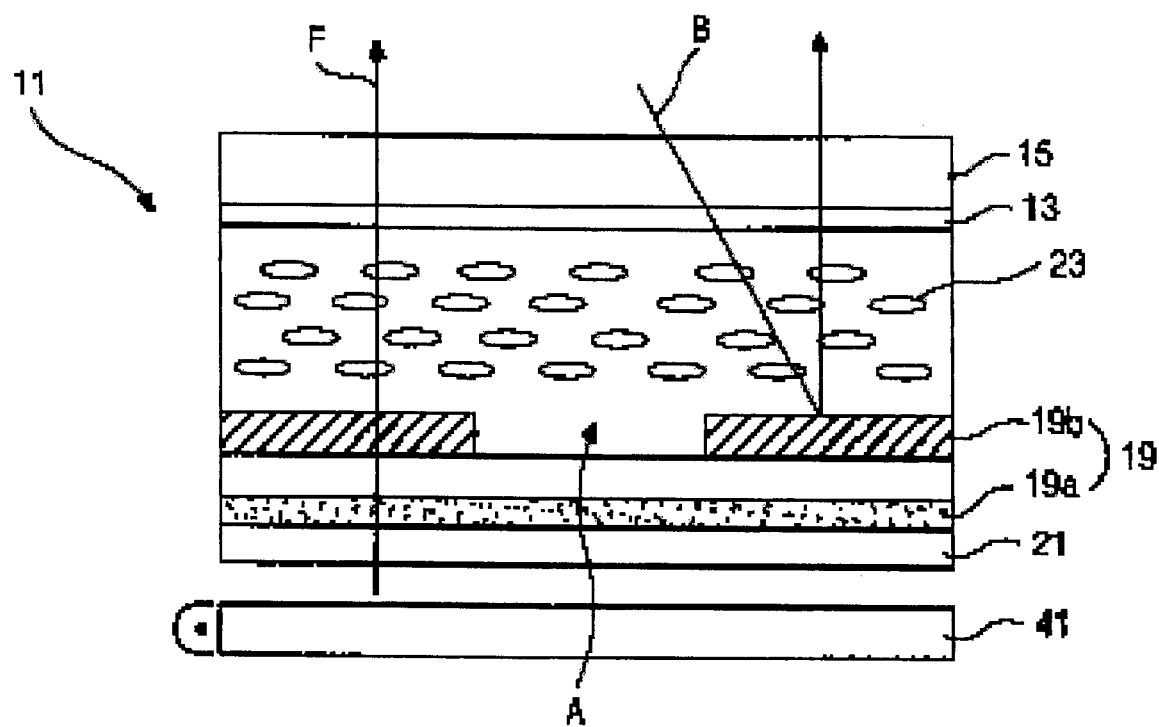
FIG. 2 is a cross-sectional view illustrating an operation of a typical transflective LCD device.
Figure 3:
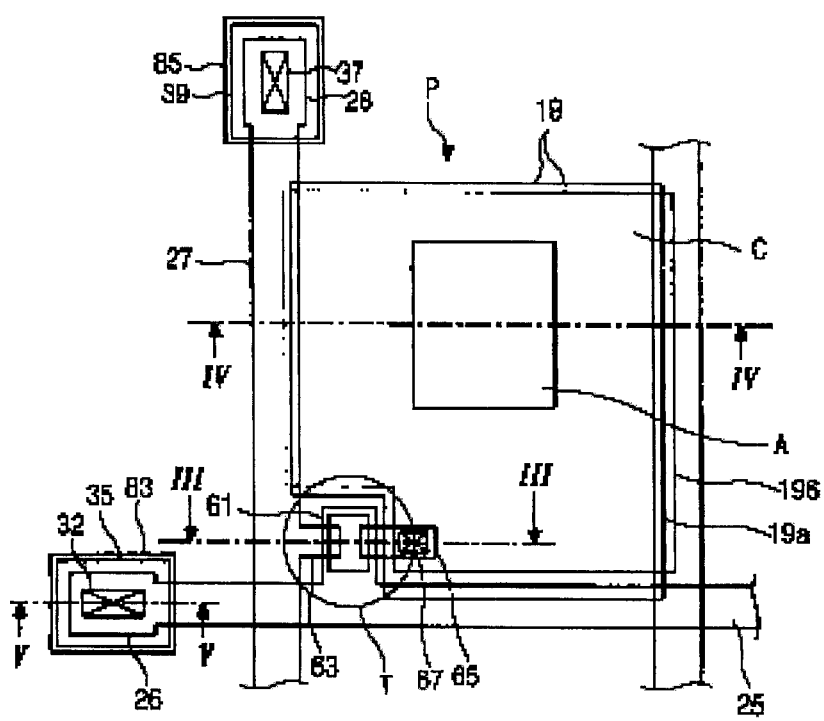
FIG. 3 is an expanded plan view illustrating a portion of an array substrate for a typical transflective LCD device.
Figure 4A:
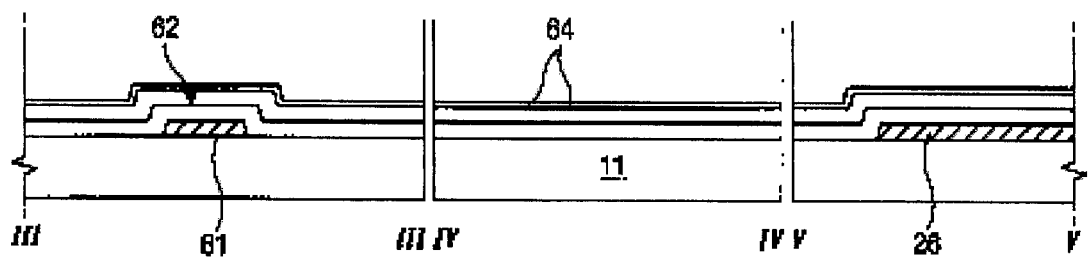
FIGS. 4A to 4F are sequential cross-sectional views taken along first to third lines "III—III", "IV—IV", and "V—V" of FIG. 3.
Figure 4B:
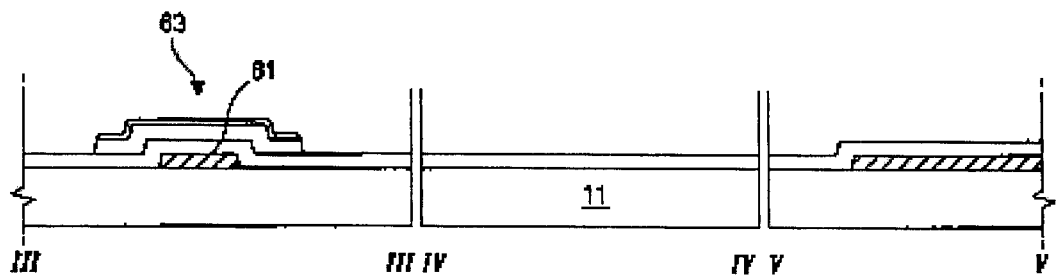
Figure 4C:
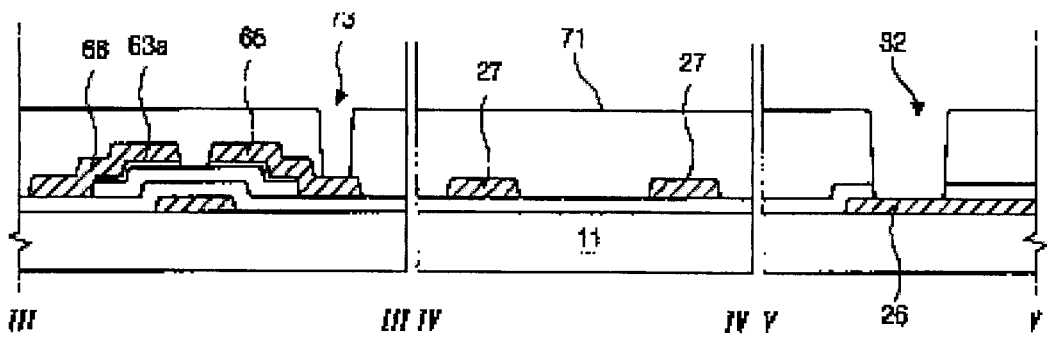
Figure 4D:
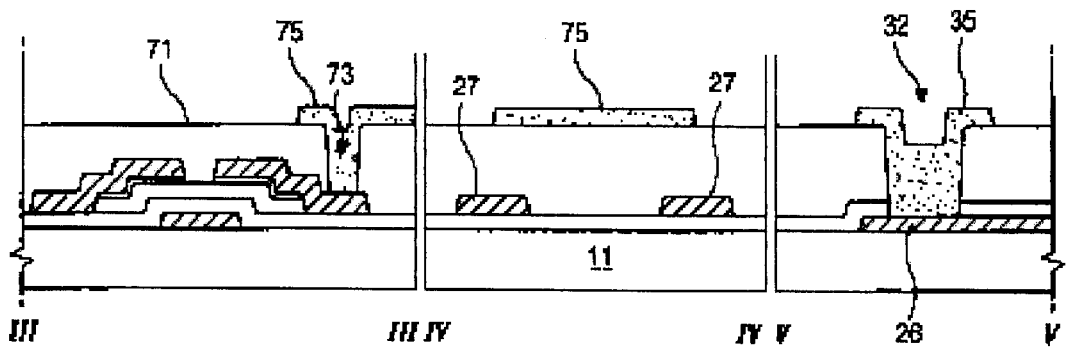
Figure 4E:
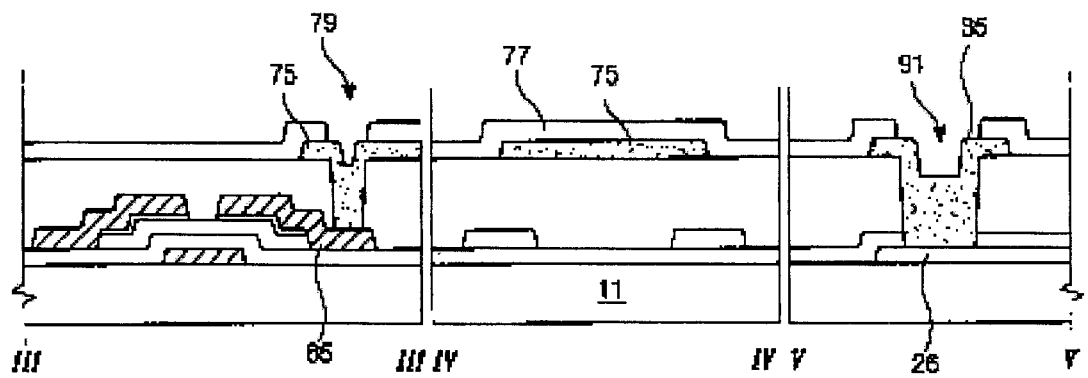
Figure 4F:
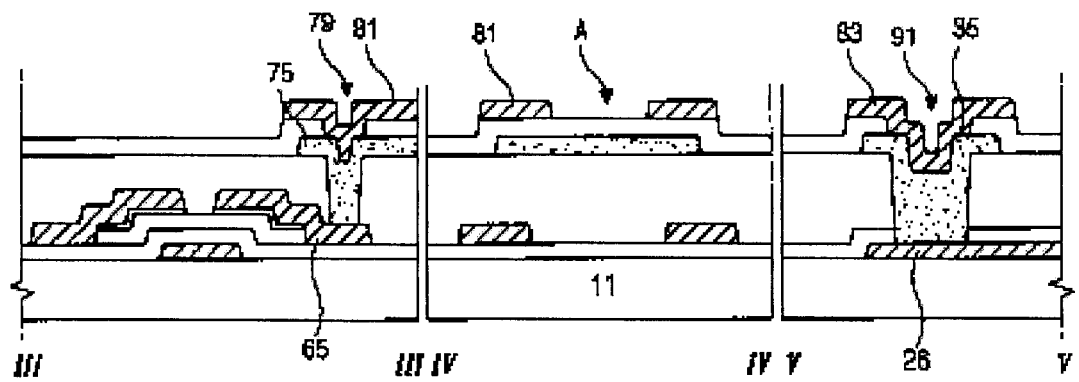

In addition, on the pixel region "P", a reflective electrode 117 having a through hole "D", and a transparent electrode 129 are sequentially disposed. The reflective electrode 117 preferably overlaps a portion of the data line 113 to achieve a high aperture ratio. In contrast, it is the transparent electrode 129 which contacts the drain electrode 123, and not the reflective electrode 117. That is to say, only the transparent electrode 129 together with a common electrode 13 (in FIG. 2) serves as an electrode to apply an electric field to a liquid crystal layer 23 (in FIG. 2). Moreover, the reflective electrode 117 serves as a reflector to reflect an ambient light, whereas the transparent electrode 123 serves as an electrode to apply an electric field to a liquid crystal layer 23 (in FIG. 2).

A fabricating process for the above-mentioned array substrate is explained hereafter. FIGS. 6A to 6E show sequential cross-sectional views taken along lines "VI—VI", "VII—VII", and "VIII—VIII" of FIG. 5.

Figure 6A:
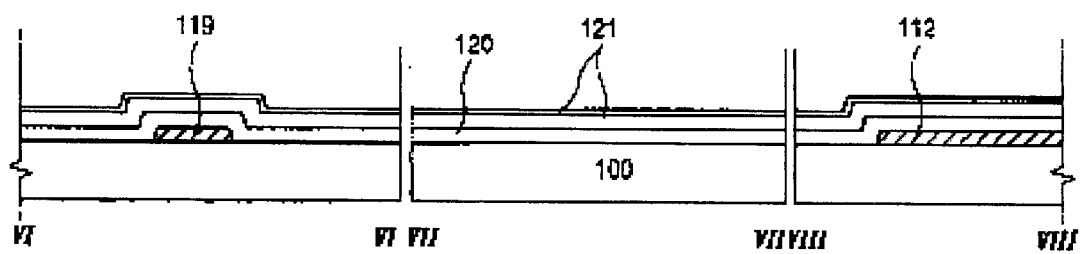
FIGS. 6A to 6E are sequential cross-sectional views taken along lines "VI—VI", "VII—VII", and "VIII—VIII" of FIG. 5.

As shown in FIG. 6A, a first metal is deposited upon the transparent substrate 100 and subsequently patterned to form a gate pad 112, a gate line (111 in FIG. 5), and a gate electrode 119. The first metal includes at least a material selected from a group comprising: chromium (CR); aluminum (Al); aluminum alloy (AL alloy); molybdenum (Mo); tantalum (Ta); tungsten (W); antimony (Sb); and alloys thereof. The gate line 111 (in FIG. 5) extends from the gate pad 112, and the gate electrode 119 protrudes from the gate line 111 (in FIG. 5). Thereafter, a gate-insulating layer 120, an amorphous silicon layer (a-Si) 121a, and a doped amorphous silicon layer 121b are sequentially formed on the first metal. The gate-insulating layer 120 includes at least silicon oxide ($SiO_2$) or silicon nitride ($SiN_x$), for example.

Figure 6B:
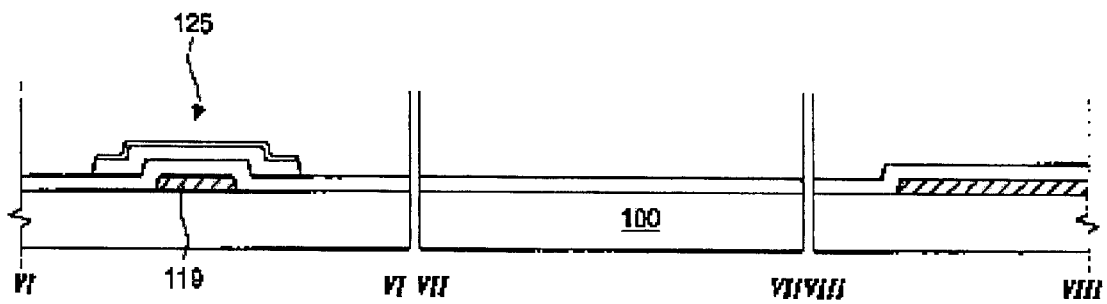
Figure 6C:
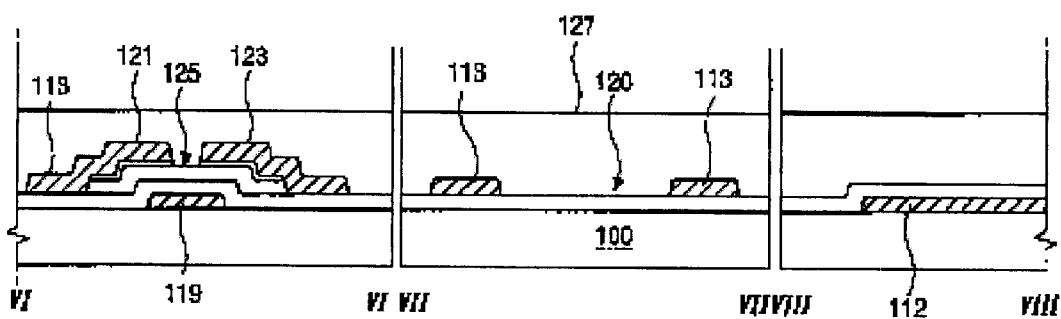

In FIG. 6B, the silicon layer 121 (in FIG. 6A) is patterned to form an active layer 125a and an ohmic contact layer 125b thereby forming a silicon island 125 positioned over the gate electrode 119. Thereafter, as shown in FIG. 6C, a second metal is deposited upon a surface of the silicon island 125. The second metal includes at least one material selected from a group consisting of chromium (CR), aluminum (Al), aluminum alloy (AL alloy), molybdenum (Mo), tantalum (Ta), tungsten (W), antimony (Sb), and alloys thereof. Then, the second metal is patterned to form a source pad 115 (in FIG. 5), a data line 113, a source electrode 121, and a drain electrode 123. The data line 113 crosses the gate line 111 (in FIG. 5), and the source pad 115 (in FIG. 5) is disposed at one end of the data line 113. The source electrode 121 protrudes from the data line 113, and the drain electrode 123 is spaced apart from the source electrode 121. The source electrode 121 and the drain electrode 123 overlap end portions of the active layer 125a with a center portion the active layer 125a positioned therebetween.

Thereafter, an exposed portion of the ohmic contact layer 125b is etched away between the source electrode 121 and the drain electrode 123, and a first passivation layer 127 is formed upon the source electrode 121, the drain electrode 123 and the data line 113. The first passivation layer 127 includes at least one of an organic insulating material selected from a group consisting of benzocyclobutene (BCB) and an acryl-based resin.

Figure 6D:
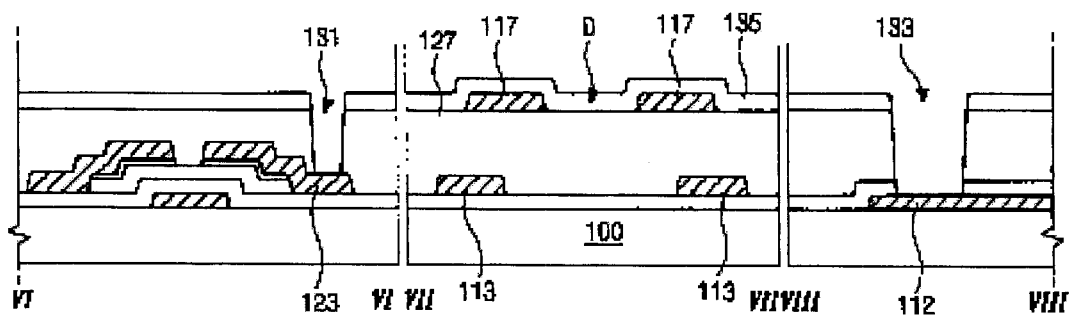

In FIG. 6D, a third metal is deposited on the first passivation layer 127 and subsequently patterned to form a reflective electrode 117 having a through hole "D" in the pixel region ("P" in FIG. 5). The third metal includes at least one material of aluminum (Al) or an aluminum alloy, which has low resistance and high reflectance properties. The reflective electrode 117 preferably overlaps a portion of the data line 113 and defines the pixel region ("P" in FIG. 5) together with the gate line 111.

Figure 1:
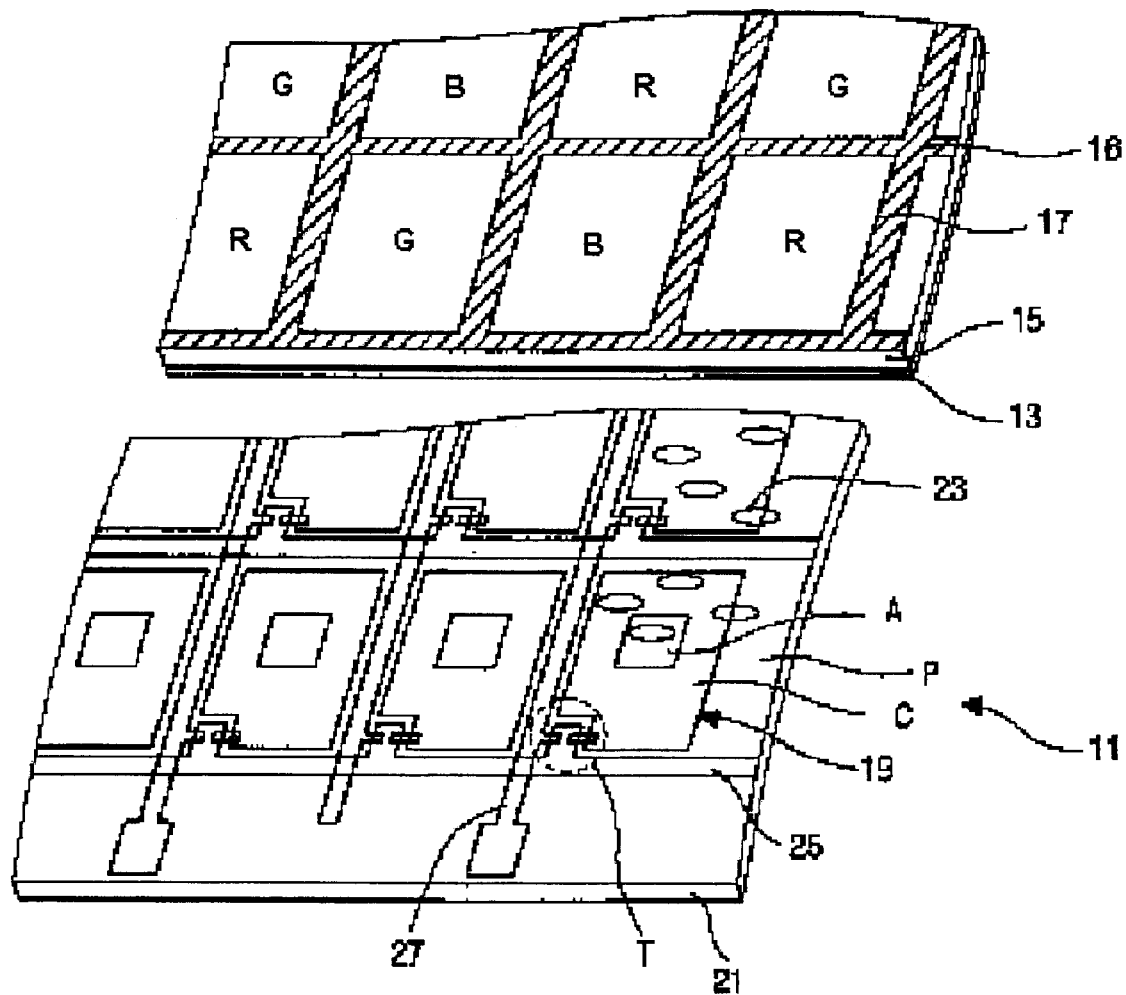
FIG. 1 is an exploded perspective view illustrating a typical transflective LCD device.
Figure 9:
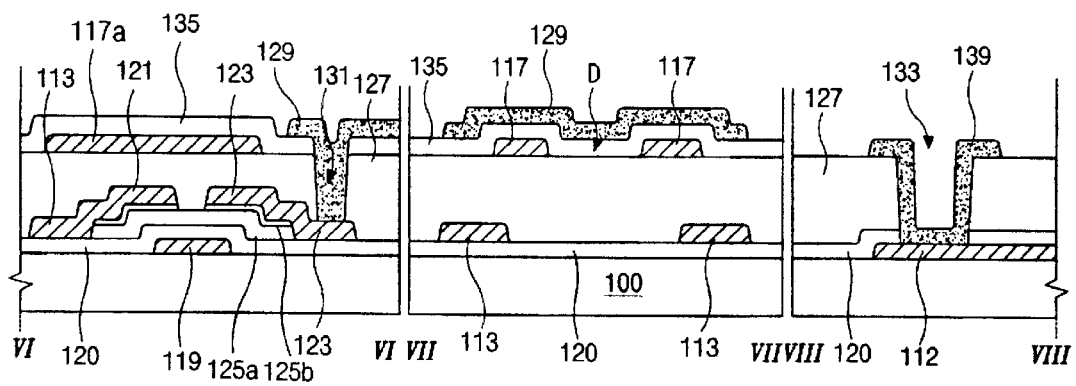
FIG. 9 is a cross-sectional view illustrating an array substrate according to a modification of the first preferred embodiment.

Since the reflective electrode 117 overlaps a portion of the data line 113, there is no interval between the data line 113 and the reflective electrode 117. Thus, the reflective electrode 117 reflects more of an ambient light while rays of a back light 41 (in FIG. 2) are prevented from passing through a possible interval between the data line 113 and a transparent electrode 129 (in FIG. 5). A black matrix (16 in FIG. 1) is conventionally used to prevent light leaking through intervals that are present between various metal lines or metal electrodes. In the first embodiment of the present invention, however, the reflective electrode 117 partially serves to prevent light leakage between various metal lines with an additional black matrix to prevent the light leak through the TFT ("T" in FIG. 5). Therefore, a smaller black matrix may be adopted for the transflective LCD device according the first embodiment of the present invention to achieve a high aperture ratio. Preferably, the reflective electrode 117 includes an island portion 117a, as in FIG. 9. The island portion 117a overlaps the TFT ("T" in FIG. 5) to prevent incident rays of back light (not shown) from passing through the TFT "T". As mentioned previously, it is the transparent electrode 129 of FIG. 5 applies an electric field to the liquid crystal layer (not shown) not the reflective electrode 117. In other words, the reflective electrode 117 does not receive any specific bias voltage, but maintains an electrically floating state.

Returning to FIG. 6D, after the reflective electrode 117 is formed, an inorganic insulating material is deposited on the reflective electrode 117 so as to form a second passivation layer 135. The inorganic insulating material includes at least on material selected from a group consisting of silicon oxide ($SiO_2$) and silicon nitride ($SiN_x$). Then, the second passivation layer 135 is patterned to form a drain contact hole 131 positioned over the drain electrode 123, a gate pad contact hole 133 positioned over the gate pad 112, and a source pad contact hole 115 (in FIG. 5) positioned over the source pad 116 (in FIG. 5).

Figure 6E:
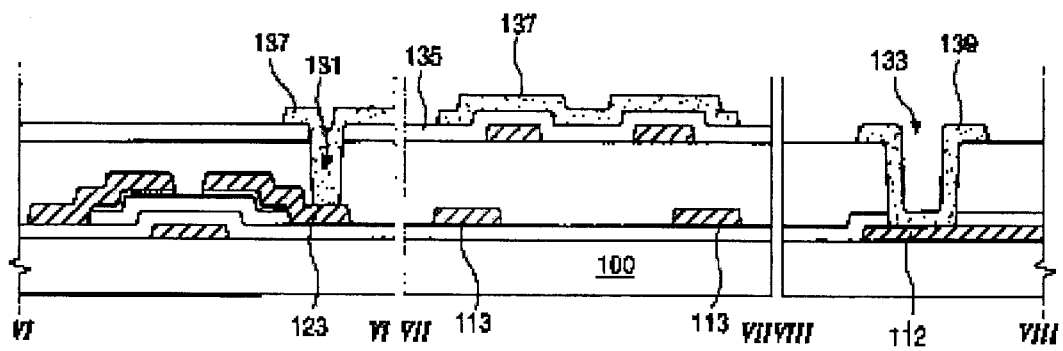

Next, in FIG. 6E, a transparent conductive material is deposited upon the second passivation layer 135 and patterned to form a transparent electrode 129 in the pixel region ("P" in FIG. 5). The transparent conductive material includes at least one material selected from a group consisting of indium tin oxide (ITO) and indium zinc oxide (IZO). The transparent electrode 129 contacts the drain electrode 123 via the drain contact hole 131, and overlaps portions of the data line 113 and the gate line 111 (in FIG. 5).

At the same time when the transparent electrode 129 is formed, a gate pad terminal 139 and a source pad terminal (138 in FIG. 5) are formed over the gate pad 112 and the source pad 115 (in FIG. 5), respectively. The gate pad terminal 139 contacts the gate pad 112 via the gate pad contact hole 133, and the source pad terminal 138 (in FIG. 5) contacts the source pad 115 via the source pad contact hole 116 (in FIG. 5).

For the transflective LCD device according to the embodiment of FIG. 5, all the liquid crystal molecules of the liquid crystal layer 23 (in FIG. 2) disposed on the transparent electrode 129 and the through hole "D", can be aligned regardless of their location. In other words, liquid crystal molecules of a first liquid crystal portion disposed on the transparent electrode 129 and liquid crystal molecules of a second liquid crystal portion disposed on the through hole "D" are aligned due to an electric field applied by the transparent electrode 129.

As described above, only the transparent electrode 129 contacts the drain electrode 123 via the drain contact hole 131, whereas the reflective electrode 117 does not contact the drain electrode 123. Therefore, a conventional contact resistance problem associated with the TFT is avoided. In addition, uppermost layers of the gate pad and the data pad include only the transparent conductive material. Therefore, conventional adhesion problems associated with the use of ductile metals and easily-oxidizable materials are avoided.

Figure 7A:
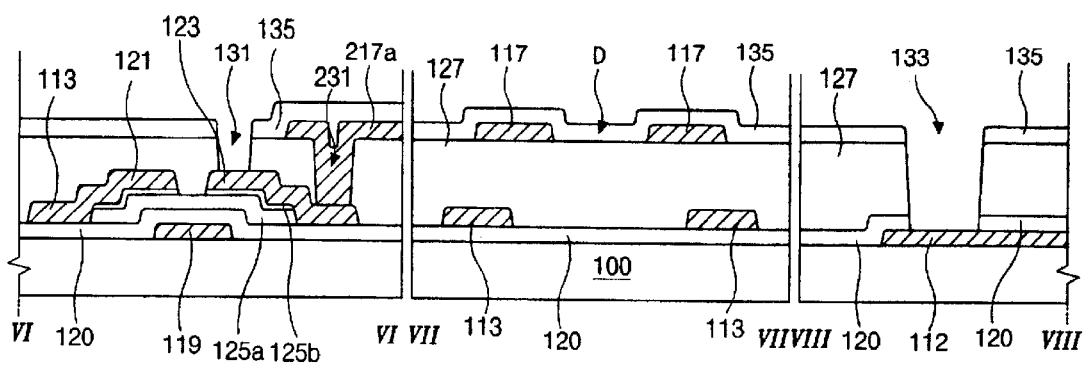
FIGS. 7A and 7B are sequential cross-sectional views illustrating an array substrate according to the embodiment of FIGS. 7A and 7B.
Figure 7B:
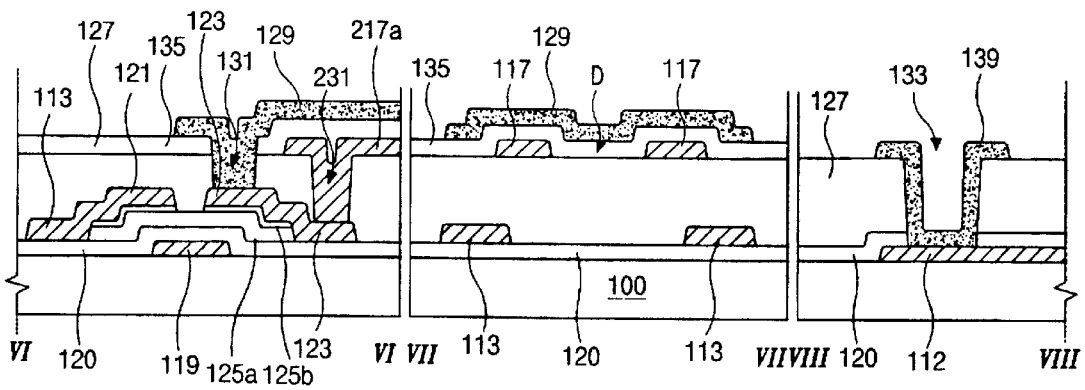

FIGS. 7A and 7B illustrate an array substrate according to another embodiment of FIGS. 7A and 7B. In this embodiment, the reflective electrode serves as both an electrode and a reflector. After a first passivation layer 127 is deposited and a first drain contact hole 231 is formed therethrough, a reflective electrode 217a is formed on the first passivation layer. The reflective electrode 217a has a first portion that overlaps a portion of the drain electrode 123 and a second portion that contacts the drain electrode 123 via the first drain contact hole 231 such that the reflective electrode 217 serves as an electrode.

Thereafter, the second passivation layer 135 is formed to cover the reflective electrode 217a. At this point, the second passivation layer 135 includes a second drain contact hole 131 that is formed to pass through the first passivation layer 127 and the second passivation layer 135 to uncover a portion of the drain electrode 123. Thereafter, in FIG. 7B, the transparent electrode 129 is formed on the second passivation layer 135 and contacts the drain electrode 123 via the second drain contact hole 131. Then, signals are applied from the drain electrode 123 to the reflective electrode 217 as well as to the transparent electrode 129.

Figure 8A:
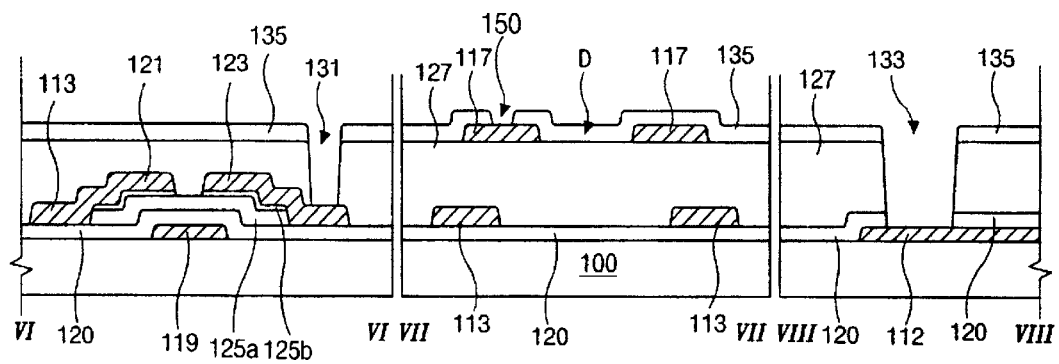
FIGS. 8A and 8B are sequential cross-sectional views illustrating an array substrate according to a modification of the second preferred embodiment.
Figure 8B:
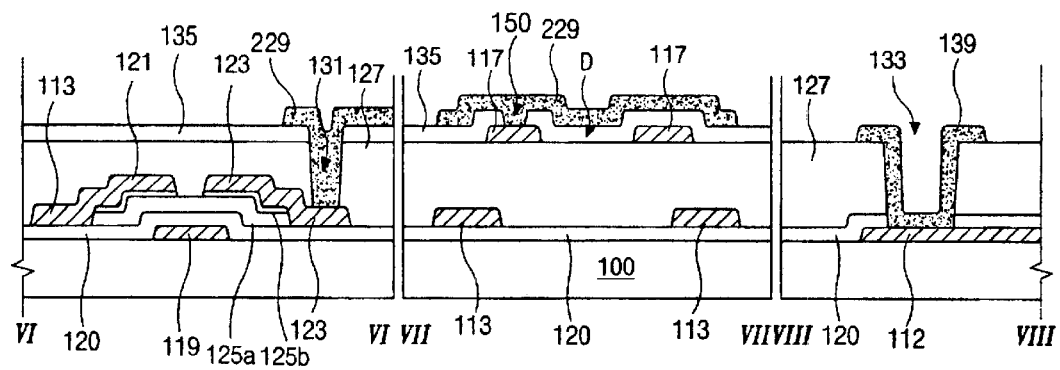

FIGS. 8A and 8B illustrate a modified array substrate according to another embodiment of FIGS. 7A and 7B. In this modification of this embodiment, the reflective electrode 117 is electrically connected with the drain electrode 123 indirectly via a transparent electrode 229, which directly contacts the drain electrode 123 as in the first embodiment of the present invention. Specifically, the transparent electrode 219 and the reflective electrode 117 contact each other via a reflective electrode contact hole 150, which is formed passing through the second passivation layer 135.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a substrate;
    at least one gate line and at least one gate electrode formed on the transparent substrate;
    a gate insulating layer formed over the at least one gate line and the at least one gate electrode;
    a silicon layer formed on the gate insulating layer, the silicon layer being positioned above the at least one gate electrode;
    a source electrode and a drain electrode formed on the silicon layer and spaced apart from each other with the silicon layer overlapped therebetween, wherein the at least one gate electrode, the source electrode, the drain electrode, and the silicon layer define a thin film transistor (TFT);
    at least one data line;
    a first passivation layer covering the at least one data line;
    a reflective electrode covering a portion of a pixel region defined by the at least one gate line and the at least one data line;
    a second passivation layer formed on the reflective electrode; and
    a transparent electrode formed on the second passivation layer, the transparent electrode being disposed in the pixel region.

2. The liquid crystal display device according claim 1, wherein the substrate is transparent.

3. The liquid crystal display device according claim 1, wherein the transparent electrode is electrically connected to the drain electrode via a contact hole formed passing through the first passivation layer and the second passivation layer.

4. The liquid crystal display device according to claim 1, wherein the reflective electrode overlaps the TFT.

5. The liquid crystal display device according to claim 1, wherein the reflective electrode does not receive any electrical bias voltage.

6. The liquid crystal display device according to claim 1, wherein the reflective electrode contacts a first portion of the drain electrode and the transparent electrode contacts a second portion of the drain electrode.

7. The liquid crystal display device according to claim 6, wherein the reflective electrode is electrically connected with the transparent electrode via a contact hole formed passing through the second passivation layer.

8. The liquid crystal display device according to claim 6, wherein the reflective electrode is electrically connected with the drain electrode via a contact hole formed passing through the first passivation layer.

9. A transflective liquid crystal display device, comprising:
    a substrate;
    a gate pad and a gate line formed on the substrate, the gate line including a gate electrode that extends from the gate pad in one direction, the gate pad being disposed on one side of the substrate;
    a gate-insulating layer formed on the substrate, the gate-insulating layer covering the gate line and the gate electrode;
    a silicon layer formed on the gate-insulating layer, the silicon layer being disposed over the gate electrode;
    a source electrode and a drain electrode spaced apart from each other with the silicon layer centered therebetween;
    a data line formed on the gate-insulating layer, the data line crossing the gate line, connecting with the source electrode, and having a source pad at one end thereof;
    a pixel region defined by the crossing gate line and the data line;
    a first passivation layer formed on the source electrode;
    a reflective electrode formed on the first passivation layer, the reflective electrode having a through hole and being disposed in the pixel region;
    a second passivation layer formed on the reflective electrode, wherein the second passivation layer includes a drain contact hole positioned over the drain electrode, a gate pad contact hole positioned over the gate pad, and a source pad contact hole positioned over the source pad, each contact hole passing through the second passivation layer;

a transparent electrode formed over the reflective electrode;

a gate pad terminal formed over the gate pad; and a source pad terminal formed over the source pad, wherein the transparent electrode contacts the drain electrode via the drain contact hole, the gate pad terminal contacts the gate pad via the gate pad contact hole, and the source pad terminal contacts the source pad via the source pad contact hole.

10. The liquid crystal display device according to claim 9, wherein the silicon layer includes at least an amorphous silicon layer and a doped amorphous silicon layer.

11. The liquid crystal display device according to claim 9, wherein the reflective electrode includes at least one of aluminum and an aluminum alloy.

12. The liquid crystal display device according to claim 9, wherein the transparent electrode includes at least one of indium tin oxide (ITO) and indium zinc oxide (IZO).

13. A method of fabricating a transflective liquid crystal display device, the method comprising the steps of:

forming a gate pad, a gate line, and a gate electrode on a substrate, the gate pad being disposed on one side of the substrate, the gate line extending from the gate pad in one direction;

forming a gate-insulating layer on the substrate, the gate insulating layer covering the gate line and the gate electrode;

forming a silicon layer on the gate-insulating layer, the silicon layer having an island shape and being disposed over the gate electrode;

forming a source pad, a data line, a source electrode, and a drain electrode on the gate insulating layer, wherein the data line crosses the gate line and extends from the source pad, and the source electrode and the drain electrode are spaced apart from each other and overlap a portion of the silicon layer;

forming a first passivation layer on the substrate to cover the source and drain electrodes;

forming a reflective electrode on the first passivation layer, the reflective electrode having a hole therethrough;

forming a second passivation layer on the reflective electrode;

forming a drain contact hole, a gate pad contact hole, and a source pad contact hole pass through the second passivation layer positioned over the drain electrode, the gate pad, and the source pad, respectively; and forming a transparent electrode on the second passivation layer, the transparent electrode contacting the drain electrode via the drain contact hole, contacting the gate pad via the gate pad contact hole, and contacting the source pad via the source pad contact hole.

14. The method according to claim 13, wherein the silicon layer includes at least an amorphous silicon layer and a doped amorphous silicon layer.

15. The method according to claim 13, wherein the reflective electrode includes at least one of aluminum and an aluminum alloy.

16. The method according to claim 13, wherein the transparent electrode includes at least one of indium tin oxide (ITO) and indium zinc oxide (IZO).

17. The method according to claim 13, wherein the transparent electrode overlaps a portion of the data line.

* * * * *